United States Patent
Mishra et al.

(10) Patent No.: US 11,385,676 B2
(45) Date of Patent: Jul. 12, 2022

(54) SINGLE-COUNTER, MULTI-TRIGGER SYSTEMS AND METHODS IN COMMUNICATION SYSTEMS

(71) Applicant: QUALCOMM Incorporated, San Diego, CA (US)

(72) Inventors: Lalan Jee Mishra, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 16/717,838

(22) Filed: Dec. 17, 2019

(65) Prior Publication Data

US 2021/0181788 A1   Jun. 17, 2021

(51) Int. Cl.
| | |
|---|---|
| G06F 1/14 | (2006.01) |
| G06F 1/3234 | (2019.01) |
| H04L 12/40 | (2006.01) |

(52) U.S. Cl.
CPC .............. *G06F 1/14* (2013.01); *G06F 1/3243* (2013.01); *H04L 12/40013* (2013.01); *H04L 12/40019* (2013.01); *H04L 12/40052* (2013.01)

(58) Field of Classification Search
CPC ... G06F 1/14; G06F 1/3243; H04L 12/40013; H04L 12/40019; H04L 12/4011
USPC ........................................................ 713/501
See application file for complete search history.

(56) References Cited

U.S. PATENT DOCUMENTS

| | | | | |
|---|---|---|---|---|
| 3,812,465 | A * | 5/1974 | Mann | H04L 12/423 318/601 |
| 4,195,291 | A * | 3/1980 | Burks, Jr. | G01P 3/486 324/175 |
| 4,374,681 | A * | 2/1983 | Schueneman | C23C 22/00 118/676 |
| 4,694,295 | A * | 9/1987 | Miller | G01S 17/931 340/903 |
| 5,146,545 | A * | 9/1992 | Maruyama | G06K 15/1276 358/1.11 |
| 5,481,560 | A * | 1/1996 | Potetz | H03K 7/08 332/110 |
| 6,909,702 | B2 * | 6/2005 | Leung | H04L 63/0428 370/278 |
| 7,002,993 | B1 * | 2/2006 | Mohaban | H04L 29/06027 370/356 |
| 9,166,481 | B1 * | 10/2015 | Vinciarelli | H02M 3/33576 |
| 10,732,928 | B1 * | 8/2020 | Akidau | G06F 7/00 |
| 11,036,981 | B1 * | 6/2021 | Liao | G06N 7/005 |
| 2004/0174945 | A1 * | 9/2004 | Lendre | G06F 1/04 377/94 |
| 2009/0248336 | A1 * | 10/2009 | Afgani | G01R 23/20 702/69 |

(Continued)

*Primary Examiner* — Paul R. Myers
(74) *Attorney, Agent, or Firm* — QUALCOMM Incorporated (57) ABSTRACT

Single-counter, multi-trigger systems and methods in communication systems consolidate tracking of multiple trigger events into a single counter in place of plural counters. The single counter may track multiple trigger events for a single triggered element. Likewise, the single counter may track trigger events for a plurality of triggered elements. By consolidating tracking of trigger events with reference to a single counter, the size of the circuit may be reduced and power savings may be achieved.

21 Claims, 11 Drawing Sheets

(56) References Cited

U.S. PATENT DOCUMENTS

| | | | |
|---|---|---|---|
| 2014/0340941 A1* | 11/2014 | Jutras | H02M 3/285 |
| | | | 363/21.01 |
| 2015/0193298 A1* | 7/2015 | Ngo | G06F 13/3625 |
| | | | 714/758 |
| 2016/0179746 A1* | 6/2016 | Hein | G06F 13/4291 |
| | | | 710/105 |
| 2017/0255579 A1* | 9/2017 | Ngo | G06F 13/404 |
| 2018/0113834 A1* | 4/2018 | O'Shea | G06F 13/4282 |
| 2018/0269921 A1* | 9/2018 | Pawliuk | H04W 56/002 |
| 2019/0347239 A1* | 11/2019 | Mishra | G06F 13/4291 |
| 2020/0280841 A1* | 9/2020 | Liu | H04B 1/40 |

* cited by examiner

SINGLE-COUNTER, MULTI-TRIGGER SYSTEMS AND METHODS IN COMMUNICATION SYSTEMS

BACKGROUND

I. Field of the Disclosure

The technology of the disclosure relates generally to circuits having multiple trigger events such as a wireless communication device having multiple trigger events based on a wireless communication protocol.

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

Most such mobile communication devices have a suite of circuits coupled to one another by a bus to serve as a radio front end. The MIPI® Alliance has promulgated a standard to make devices associated with such radio front ends compatible. This standard is descriptively named the Radio Frequency Front End Control Interface (RFFE). The standard was initially released in July 2010 as v.1.00.00. Subsequently, RFFE has been updated to accommodate 5G communication requirements. In particular, RFFE 3.0 has introduced the concept of a Timed-Trigger that permits reduction in control latency, but necessitates tracking multiple trigger events in RFFE slave devices. Typically, such trigger tracking demands multiple counters.

Using multiple counters takes up non-trivial amounts of space within an integrated circuit (IC) containing the RFFE slave. Further, such multiple counters require relatively high power consumption, which may have negative ramifications on time between charging for a battery of the mobile communication device. Accordingly, there is room for improvement in how multiple triggers are handled in RFFE slave devices.

SUMMARY OF THE DISCLOSURE

Aspects disclosed in the detailed description include single-counter, multi-trigger systems and methods in communication systems. In particular, exemplary aspects of the present disclosure consolidate tracking of multiple trigger events into a single counter in place of plural counters. The single counter may track multiple trigger events for a single triggered element. Likewise, the single counter may track trigger events for a plurality of triggered elements. By consolidating tracking of trigger events with reference to a single counter, the size of the circuit may be reduced and power savings may be achieved.

In this regard in one aspect, an integrated circuit (IC) is disclosed. The IC includes a counter. The IC also includes a comparator comprising a set-point register. The comparator is coupled to the counter and configured to compare a value from the counter to a value in the set-point register and output a signal when there is a match. The IC also includes a register coupled to the comparator and configured to receive the signal. The IC also includes a trigger circuit coupled to the register and configured to receive a register value stored in the register when the register receives the signal.

In another aspect, an IC is disclosed. The IC includes a means for counting. The IC also includes a means for comparing comprising a set-point register. The means for comparing is coupled to the means for counting and configured to compare a value from the means for counting to a value in the set-point register and output a signal when there is a match. The IC also includes a means for storing coupled to the means for comparing and configured to receive the signal. The IC also includes a trigger circuit coupled to the means for storing and configured to receive a register value stored in the means for storing when the means for storing receives the signal.

In another aspect, a method for controlling a trigger circuit in a slave IC coupled to a bus is disclosed. The method includes, when an output from a counter matches a value in a set-point register in a comparator, outputting a signal to a register. The method also includes, responsive to receiving the signal from the comparator, loading a value from the register to the trigger circuit.

In another aspect, a radio frequency front end (RFFE) system is disclosed. The RFFE system includes a host IC, an RFFE bus coupled to the host IC, and a slave IC coupled to the RFFE bus. The slave IC includes a counter. The slave IC also includes a comparator comprising a set-point register. The comparator is coupled to the counter and configured to compare a value from the counter to a value in the set-point register and output a signal when there is a match. The slave IC also includes a register coupled to the comparator and configured to receive the signal. The slave IC also includes a trigger circuit coupled to the register and configured to receive a register value stored in the register when the register receives the signal.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include single-counter, multi-trigger systems and methods in communication systems. In particular, exemplary aspects of the present disclosure consolidate tracking of multiple trigger events into a single counter in place of plural counters. The single counter may track multiple trigger events for a single triggered element. Likewise, the single counter may track trigger events for a plurality of triggered elements. By consolidating tracking of trigger events with reference to a single counter, the size of the circuit may be reduced and power savings may be achieved.

Exemplary aspects of the present disclosure are well suited for use in a radio frequency front end (RFFE) system within a mobile terminal. However, other systems that use multiple trigger events for triggered elements may also benefit from the present disclosure and the present disclosure is not limited to an RFFE system. Before discussing particular aspects of the present disclosure, an overview of a mobile computing device (sometimes referred to as a mobile terminal) is provided with reference to FIG. 1 so that the context of an RFFE system is understood. An overview of a slave device in an RFFE system is provided with reference to FIG. 2. Exemplary problems with conventional systems are highlighted with reference to FIGS. 3A and 3B. A discussion of exemplary aspects of the present disclosure begins below with reference to FIG. 4.

Figure 1:
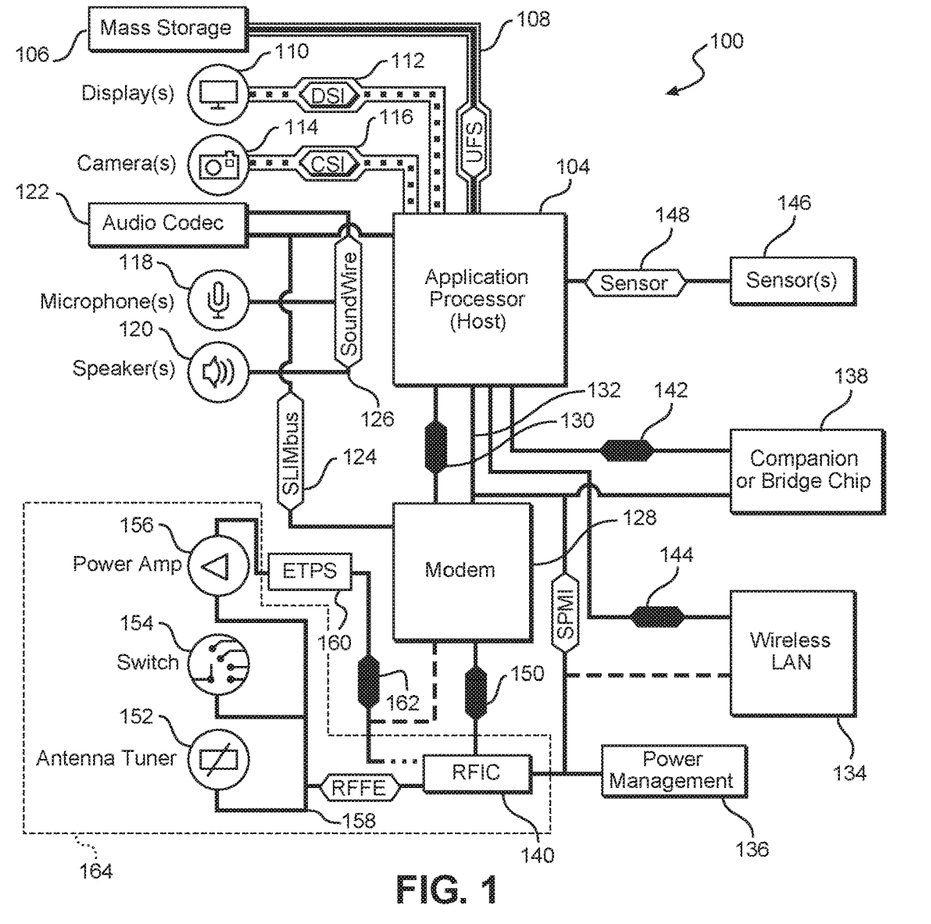
FIG. 1 is a block diagram of an exemplary wireless communication device having a radio frequency front end (RFFE) system with an RFFE bus.

In this regard, FIG. 1 is a system-level block diagram of an exemplary mobile terminal 100 such as a smart phone, mobile computing device, tablet, or the like. The mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUND-WIRE bus 126. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a wireless local area network (LAN or WLAN) integrated circuit (IC) (LAN IC or WLAN IC) 134, a power management integrated circuit (PMIC) 136, a companion IC (sometimes referred to as a bridge chip) 138, and a radio frequency IC (RFIC) 140. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through an RFFE bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated).

It should be appreciated that typically the RFIC 140 is considered the master or host of the RFFE system 164 and particularly the master of the RFFE bus 158. In contrast, the antenna tuner 152, the switch 154, and the power amplifier 156 are typically considered to be slaves for the RFFE system 164 and the RFFE bus 158.

Figure 2:
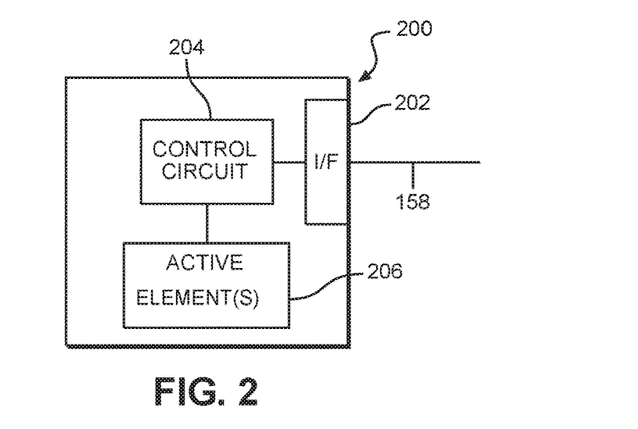
FIG. 2 is a block diagram of an RFFE slave that may be associated with the RFFE bus of FIG. 1.

A generic RFFE slave 200 is illustrated in FIG. 2. In particular, the RFFE slave 200 includes a bus interface (sometimes referred to as I/F) 202 that is configured to couple to the RFFE bus 158. The bus interface 202 is controlled by a control circuit 204, which may also control one or more active elements 206 (only one shown).

By way of example, the RFFE slave 200 may be the power amplifier 156, and the active elements 206 may be individual low noise amplifiers (LNAs) for different frequency bands. The active elements 206 may need to be triggered at certain times depending on which frequencies are being used to effectuate wireless communications (e.g., to or from a remote base station). In view of this need to activate or trigger the active elements 206, they are also referred to as triggered elements. As noted above, the RFFE 3.0 standard introduced the concept of timed triggers, which trigger triggered elements at specific times. It should further be appreciated that the while the term "triggered elements" is used, an actual active element 206 is in reality a circuit within an IC or chip that is the RFFE slave 200. While exemplary aspects of the RFFE slave 200 include new circuit structures within the control circuit 204, the actual active elements 206 are generally conventional and well understood.

Figure 3A:
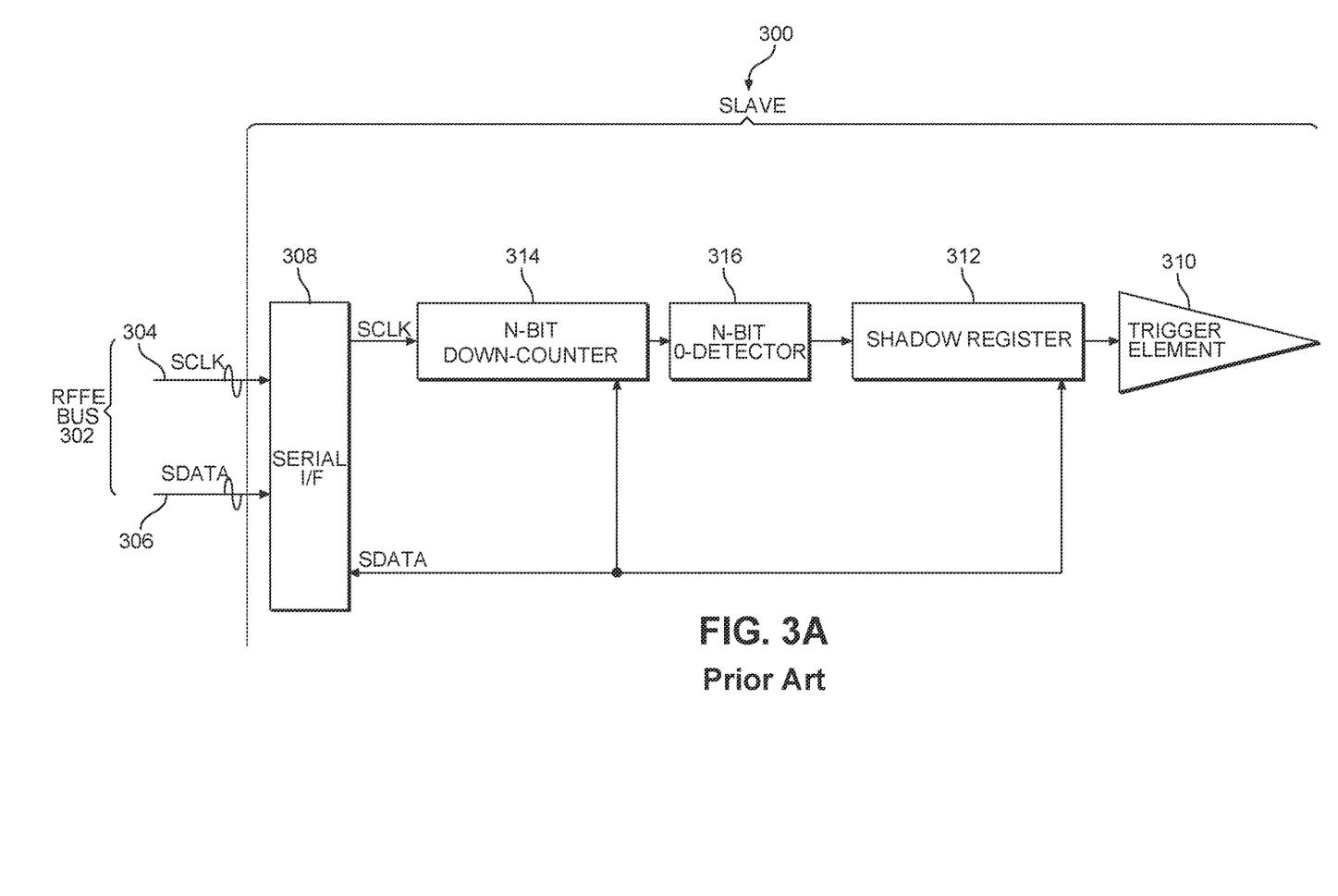
FIG. 3A is a simplified block diagram of a conventional RFFE slave having a single counter for a given triggered circuit.

Conventional systems provide individual counters and registers for each active element to track trigger events. To assist in understanding this conventional system, FIG. 3A illustrates a slave 300 coupled to an RFFE bus 302. The RFFE bus 302 is further coupled to a host or master (not shown) and includes a clock line 304 and a data line 306. The clock line 304 carries a clock signal SCLK thereon and the data line 306 carries a data signal SDATA thereon. The slave 300 is coupled to the RFFE bus 302 through a serial I/F 308. The slave 300 further includes a trigger element 310, which for the sake of example, may be an LNA. The trigger element 310 needs to be triggered at a precise time to amplify a signal that is being manipulated (e.g., transmitted or received) by an RFFE system (not shown). The host (still not shown) sends instructions and a timing value in the SDATA signal over the data line 306. The instructions are loaded into a shadow register 312 and the timing value is loaded into an N-bit down-counter 314. The SCLK signal causes the N-bit down-counter 314 to decrement down from the timing value loaded therein from the SDATA signal. An N-bit 0-detector 316 detects when the N-bit down-counter 314 has been decremented down to zero (0) and when 0 is reached, causes the contents of the shadow register 312 to be loaded into the trigger element 310.

Figure 3B:
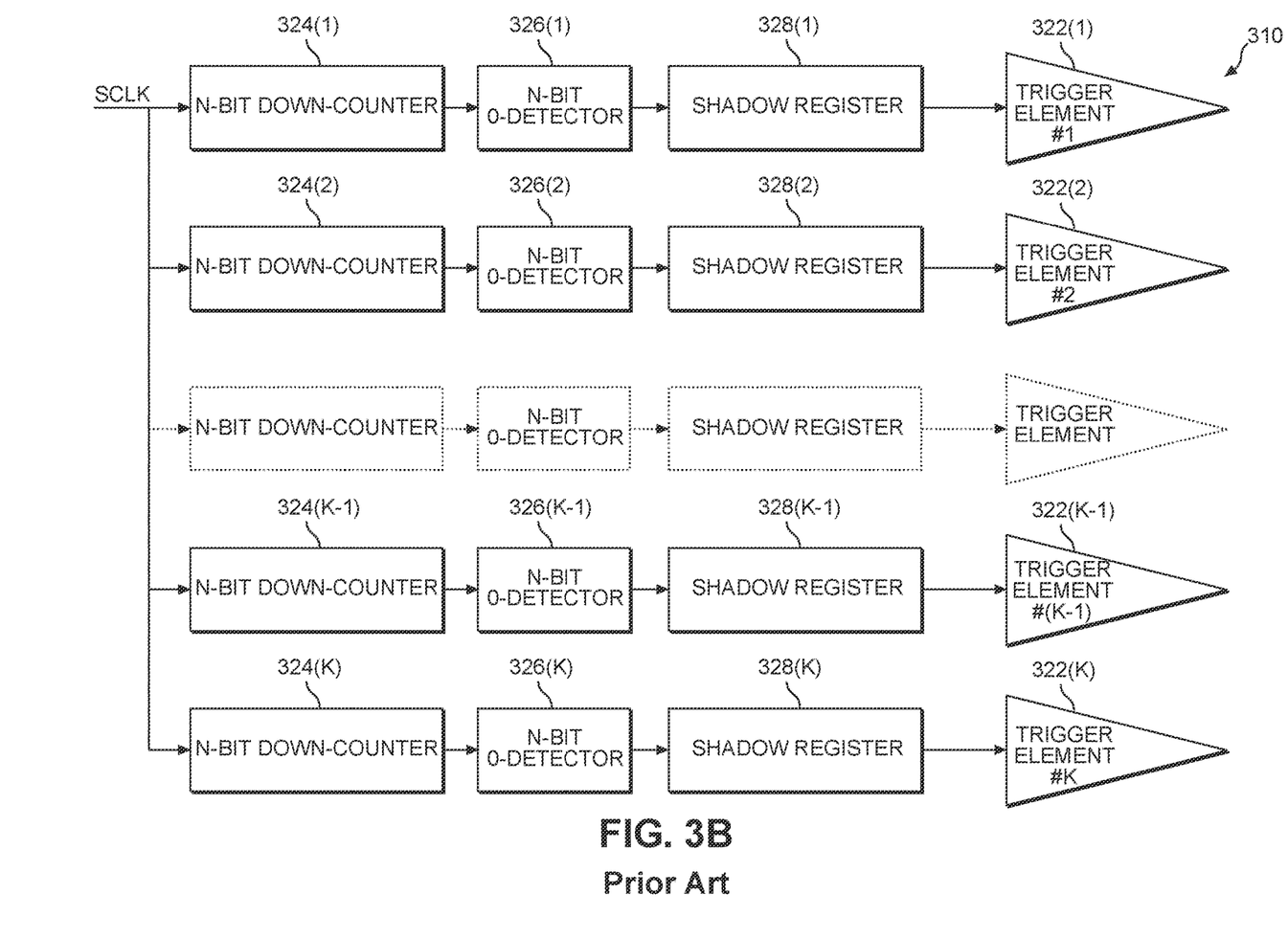
FIG. 3B is a simplified block diagram of a conventional RFFE slave having multiple triggered elements, each having a dedicated counter and detector.

Similarly, FIG. 3B illustrates a slave 320 that has multiple trigger elements 322(1)-322(K). For each of the multiple trigger elements 322(1)-322(K), there is a corresponding N-bit down-counter 324(1)-324(K), an N-bit 0-detector 326(1)-326(K), and a shadow register 328(1)-328(K). Again, the contents of the shadow registers 328(1)-328(K) are loaded from data in the SDATA signal (not shown in FIG. 3B) as are values for the N-bit down-counters 324(1)-324(K). Each N-bit down-counter 324(1)-324(K) is decremented by the SCLK signal. When a zero is detected by the corresponding one of the N-bit 0-detectors 326(1)-326(K), the contents of the corresponding shadow register 328(1)-328(K) are loaded into the respective trigger element 322(1)-322(K). Again, the trigger elements 322(1)-322(K) may be, for example, LNAs, each operating at different frequencies which are turned on to certain amplifications at different times.

The presence of the plural N-bit down-counters 324(1)-324(K), one for each trigger element 322(1)-322(K) consumes relatively large amounts of space within an IC. Likewise, each N-bit down-counter 324(1)-324(K) consumes power which may negatively impact time between recharging a battery associated with a mobile terminal. Exemplary aspects of the present disclosure consolidate N-bit down-counters and change the N-bit 0-detectors to comparators that can detect a variety of different bit values so that the N-bit down-counter does not have to reach zero before the contents of the shadow register are loaded into a trigger element. Further, by consolidating the N-bit down-counters, it is easier to synchronize triggers. That is, instead of having to synchronize multiple counters, the single counter inherently allows the synchronization.

Figure 4:
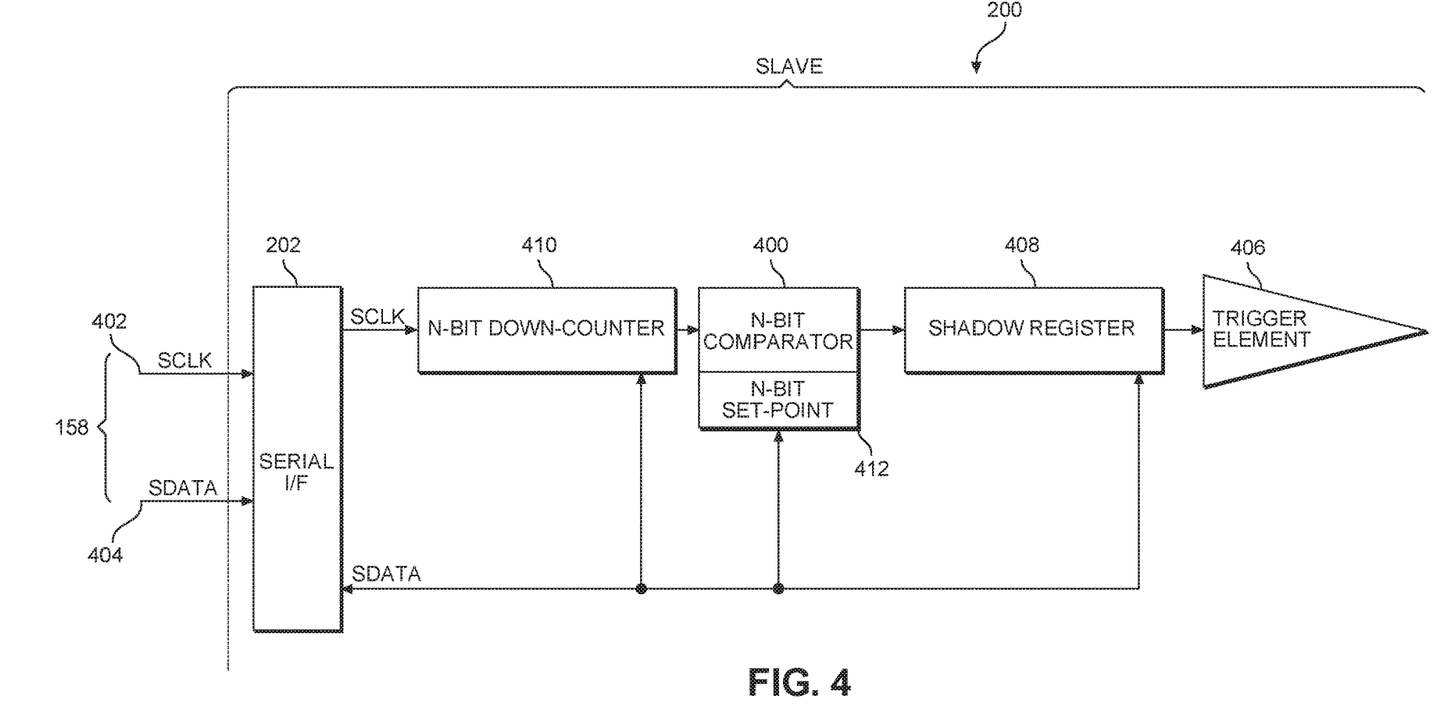
FIG. 4 is a block diagram of an RFFE slave with a single counter and a multi-bit comparator for a triggered element according to an exemplary aspect of the present disclosure.

An exemplary aspect of the present disclosure is illustrated in FIG. 4 where instead of the N-bit 0-detector, a slave 200 has an N-bit comparator 400. Comparators may sometimes be referred to herein as a means for comparing. Comparator circuits are well understood and any conventional comparator circuit may be used. The slave 200 includes the serial I/F 202, which is coupled to the RFFE bus 158 which includes a clock line 402 carrying an SCLK signal thereon and a data line 404 carrying an SDATA signal thereon. The slave 200 further includes a trigger element 406. Data from the SDATA signal is loaded into a shadow register 408. Timing information from the SDATA signal is loaded into an N-bit down-counter 410. Counters may sometimes be referred to as a means for counting. Counter circuits are well understood and any conventional counter circuit may be used. Additional timing information is loaded into an N-bit set-point register 412 of the N-bit comparator 400. Registers may sometimes be referred to herein as a means for storing. Registers are well understood and any conventional register may be used. When the N-bit comparator 400 detects that the value in the N-bit down-counter 410 is equal to the value loaded into the N-bit set-point register 412, the contents of the shadow register 408 are loaded into the trigger element 406. By changing the N-bit 0-detector to the comparator 400, different trigger points may be provided. Further, the N-bit set-point register 412 may be configured to hold multiple comparison points. In this fashion, a single register and single counter can allow multiple triggers of a single trigger element 406. Use of multiple comparison points may allow the same data or command to be loaded readily into the trigger element 406 repeatedly without requiring new datagrams in the SDATA signal, which may reduce latency.

Figure 5:
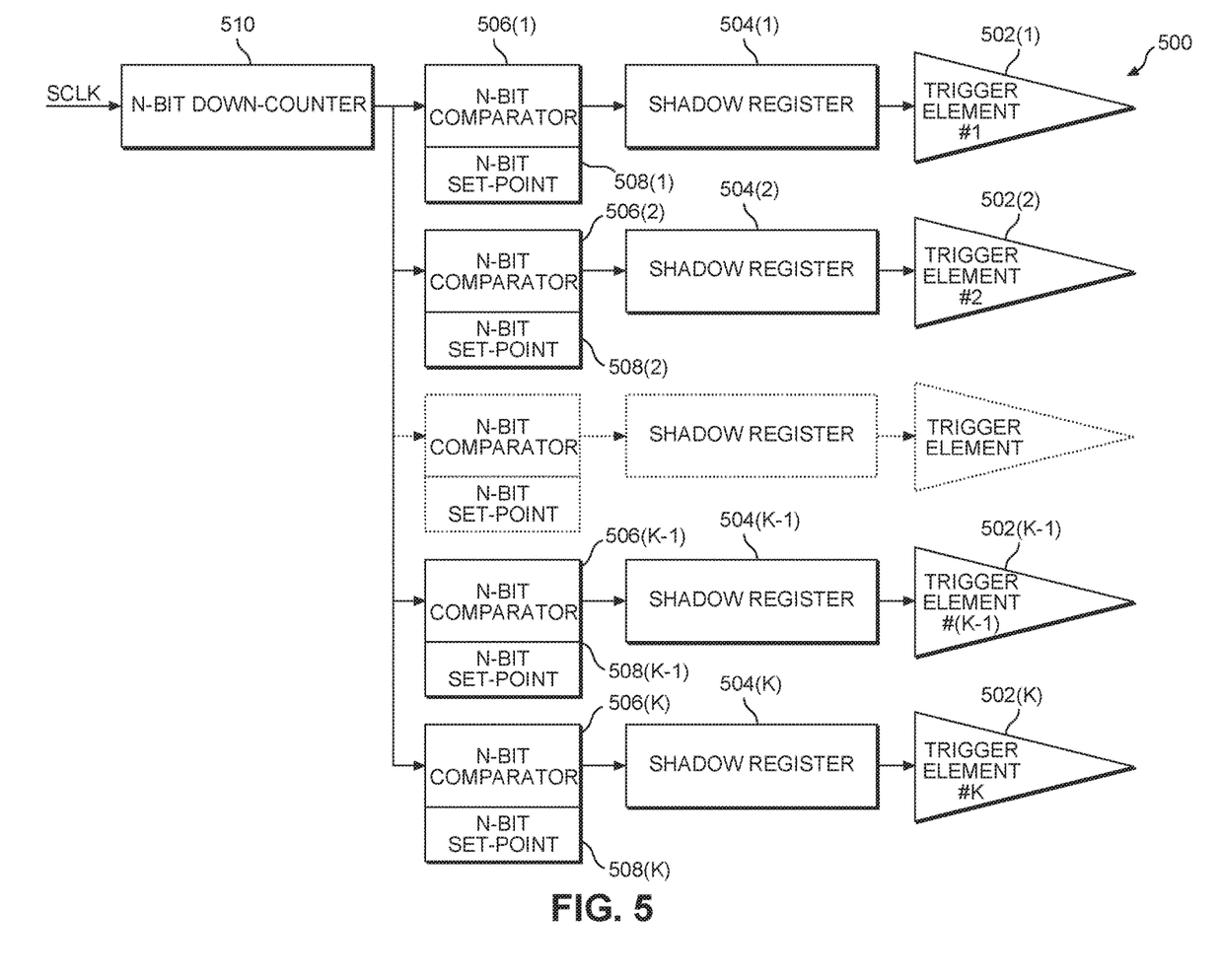
FIG. 5 is block diagram of an RFFE slave with a single counter and multiple associated comparators for a plurality of triggered elements according to an exemplary aspect of the present disclosure.

While having the ability to have multiple triggers for a single trigger element with a single counter is useful, the present disclosure is not limited to such situations. In particular, exemplary aspects of the present disclosure contemplate using a single counter for multiple trigger elements. In this regard, FIG. 5 illustrates a slave 500, which may correspond to any of the slaves in the RFFE system 164 of FIG. 1 and may have the general structure of slave 200. However, unlike slave 200, the slave 500 includes multiple trigger elements 502(1)-502(K) (generically 502) (e.g., multiple LNAs operating at different frequencies). Each of the trigger elements 502(1)-502(K) may have a corresponding shadow register 504(1)-504(K) (generically 504) and a corresponding N-bit comparator 506(1)-506(K) (generically 506). Each N-bit comparator 506(1)-506(K) may have an N-bit set-point register 508(1)-508(K) which may be configured to hold multiple set points. As with slave 200, the slave 500 has only a single N-bit down-counter 510. As with slave 200, the SCLK signal causes the N-bit down-counter 510 to decrement down from an initial value loaded therein from an instruction in the SDATA signal. The value in the N-bit down-counter 510 is compared at each of the N-bit comparators 506(1)-506(K) to the value(s) loaded in the respective N-bit set-point registers 508(1)-508(K). When there is a match, a given comparator 506 will cause the contents of the corresponding shadow register 504 to be loaded into the corresponding trigger element 502. Again, because all the trigger elements 502(1)-502(K) are using the same counter, synchronization is more readily achieved. Again, the use of multi-set points for a given trigger element 502(1)-502(K) may allow the given trigger to fire multiple times within a trigger window without needing additional data from the SDATA signal, which may reduce latency.

In a further exemplary aspect, the slave may have multiple comparators and shadow registers for each trigger element. Thus, instead of having multiple set-point triggers stored in an N-bit set point register, the present disclosure also contemplates a situation where a given trigger element has plural shadow registers, each with an associated N-bit comparator, each comparator having its own N-bit set-point register. This arrangement may be appropriate where different values are loaded from the shadow register to the trigger element or the like. These different values may still be sent in a single datagram in the SDATA signal, which may help reduce latency. In this regard, a slave 600, illustrated in FIG. 6, includes multiple trigger elements 602(1)-602(K) (generically 602) (e.g., multiple LNAs operating at different frequencies). Each of the trigger elements 602(1)-602(K) may have a corresponding plurality of shadow registers 604(1,1-1,N)-604(K,1-K,N) (generically 604) and a corresponding plurality of N-bit comparators 606(1,1-1,N)-606(K,1-K,N) (generically 606). Each N-bit comparator 606(1,1-1,N)-606(K,1-K,N) may have an N-bit set-point register 608(1,1-1,N)-608(K,1-K,N) which may be configured to hold multiple set points. As with slave 200, the slave 600 has only a single N-bit down-counter 610. As with slave 200, the SCLK signal causes the N-bit down-counter 610 to decrement down from an initial value loaded therein from an instruction in the SDATA signal. The value in the N-bit down-counter 610 is compared at each of the N-bit comparators 606(1,1-1,N)-606(K,1-K,N) to the value(s) loaded in the respective N-bit set-point registers 608(1,1-1,N)-608(K,1-K,N). When there is a match, a given comparator 606 will cause the contents of the corresponding shadow register 604 to be loaded into the corresponding trigger element 602. While illustrated as each trigger element 602 having the same number (N) of associated shadow registers 604 (e.g., both trigger elements 602(1) and 602(2) have N shadow registers 604(1,1-1,N) and 604(2,1-2,N)) it should be appreciated that different trigger elements 602(1)-602(K) may have different numbers of associated shadow registers 604 (e.g., trigger element 602(K) may have M associated shadow registers 604(K,1-K,M)) without departing from the scope of the present disclosure.

Figure 6:
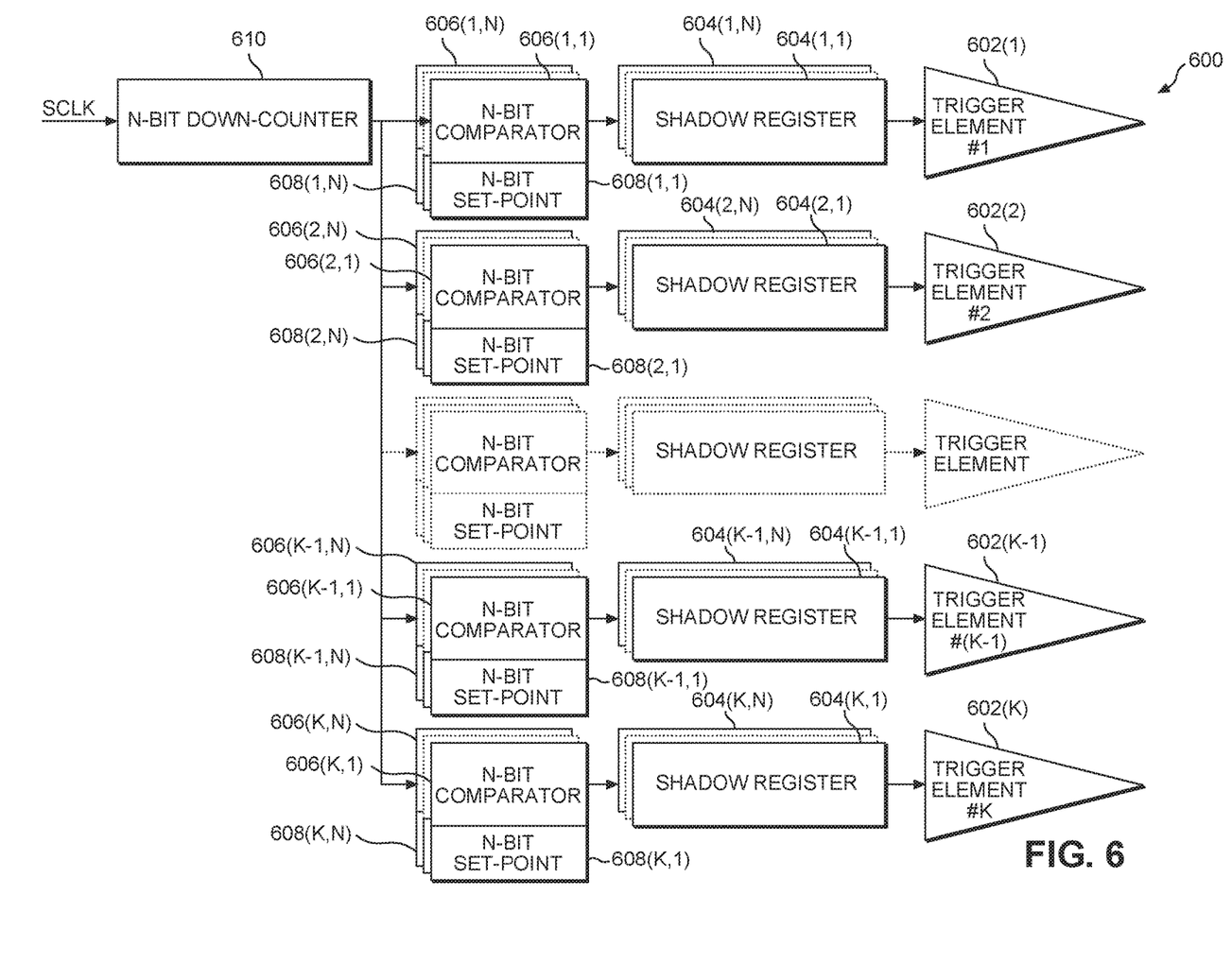
FIG. 6 is a block diagram of an RFFE slave with a single counter and multiple multi-bit comparators for a plurality of triggered elements according to an exemplary aspect of the present disclosure.

Note that the arrangement of slave 600 with its plural registers and comparators for each trigger element 602 may use more space than the arrangement of slave 500, but the elimination of the multiple counters still provides space and power savings.

While exemplary aspects of the present disclosure stress that there is only a single N-bit down-counter, it should be appreciated that space savings may be achieved by any reduction in the number of N-bit down-counters. Thus, the present disclosure also contemplates a situation where there may be multiple N-bit down-counters, but at least one of the N-bit down-counters is used by at least two trigger elements.

Figure 7:
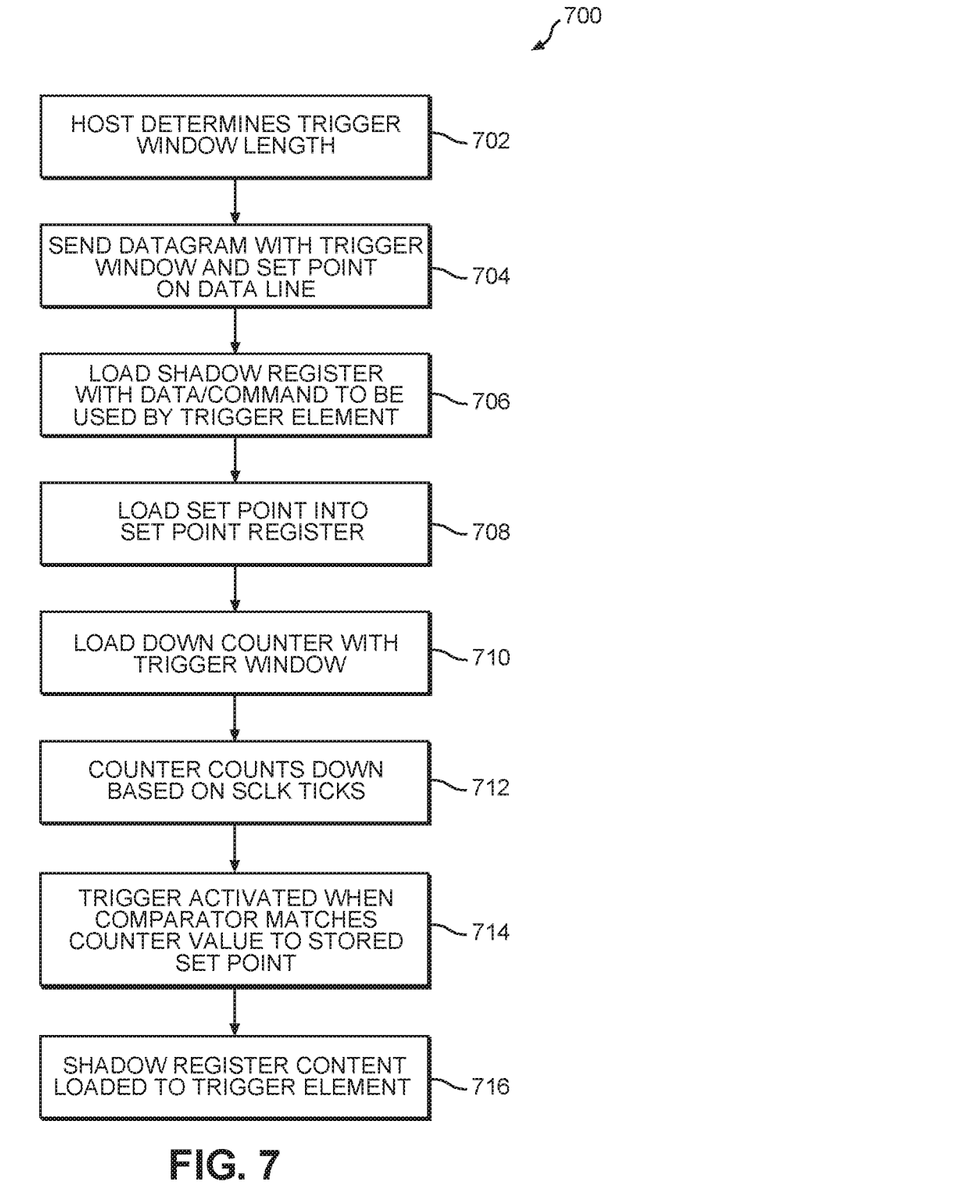
FIG. 7 is a flowchart illustrating a process for determining a trigger window, sending it and trigger events to a slave, and how the slave uses the same to control a trigger element.

In summary, the general process is illustrated in FIG. 7 as a flowchart of a process 700. The host (e.g., RFIC 140) determines a trigger window length (block 702) based on a trigger needing the highest number of clock cycles. This future trigger may be based on a 5G message from a base station, a requirement from the application processor 104, or the like. The host may then assemble and send a datagram with a trigger window and set point on the data line (block 704) of the RFFE bus 158 to the slave. The slave receives the datagram and loads the shadow register with the data or command to be used by the trigger element (block 706). The slave also loads the set point into the set point register (block 708). The slave also loads the down-counter with the trigger window (block 710). The counter counts down based on the SCLK ticks (block 712). The trigger is activated when the comparator matches the counter value to the stored set point (block 714). The shadow register content is loaded to the trigger element when the trigger is activated (block 716).

Note that while the above discussion has specifically recited that the counter is a countdown timer, the present disclosure contemplates a count up timer as well. Those of ordinary skill in the art should readily understand the minor modifications that would accommodate a count up timer.

Figure 8:
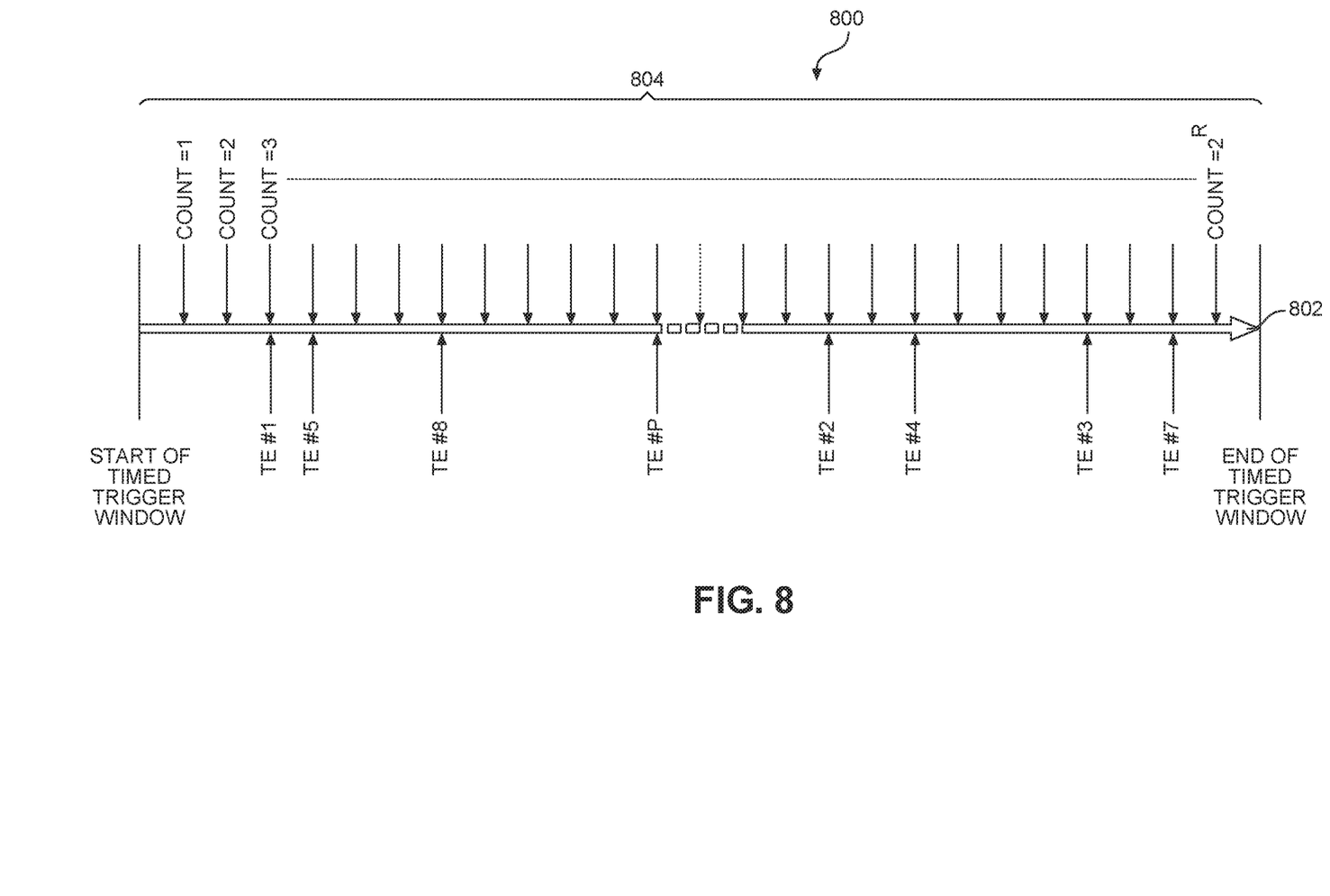
FIG. 8 is a timing diagram showing multiple triggers for the same event for a trigger element that may be tracked by a single counter according to exemplary aspects of the present disclosure.
Figure 9:
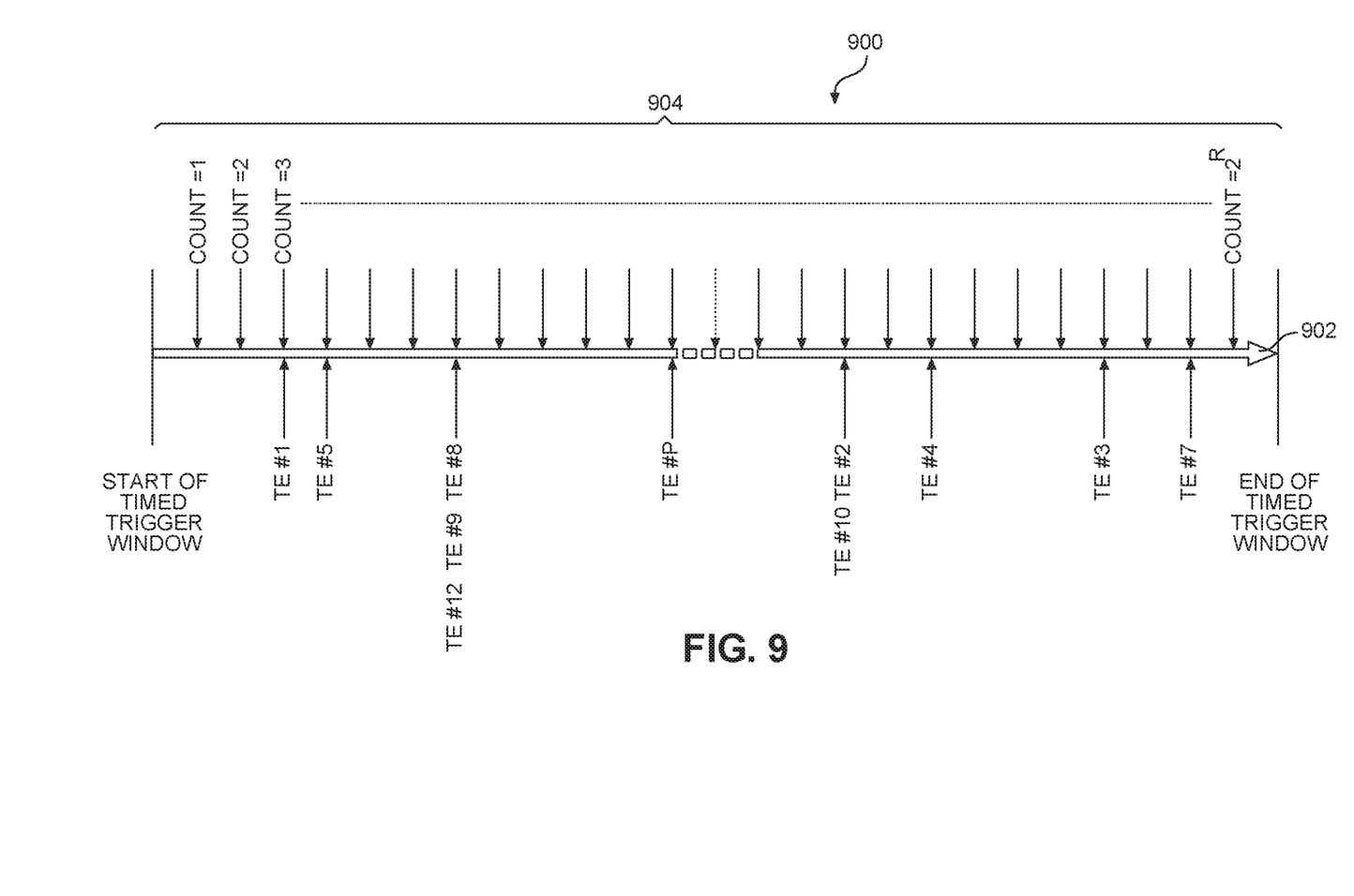
FIG. 9 is a timing diagram showing multiple triggers for multiple events for a trigger element that may be tracked by a single counter.
Figure 10:
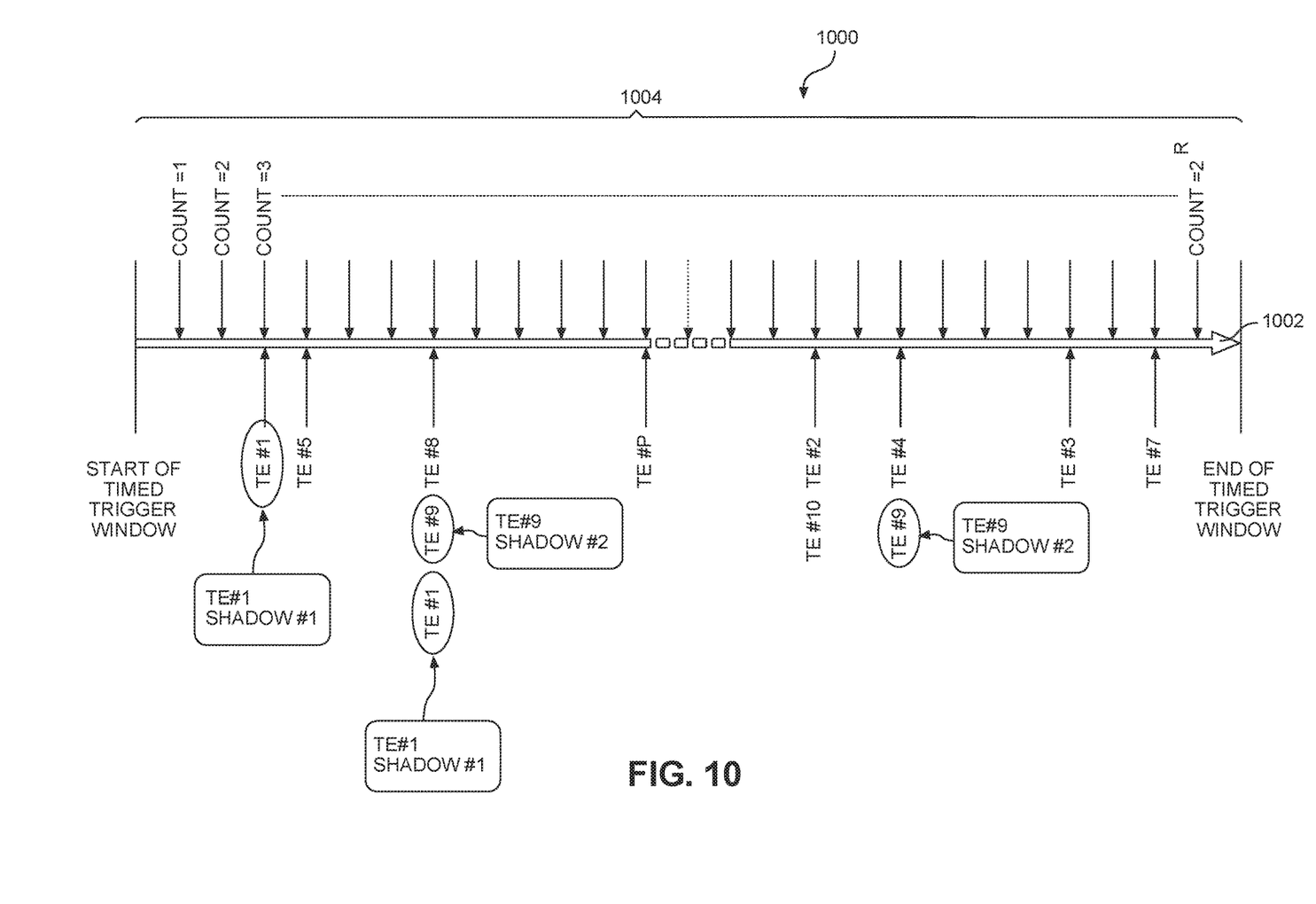
FIG. 10 is a timing diagram showing how a slave can have the same event triggered more than once in a given trigger window.

FIGS. 8-10 show various timing diagrams of how trigger events work relative to trigger windows loaded into the counter. In particular, FIG. 8 illustrates a timing diagram 800 for the slave 200 (i.e., a single trigger element 406, a single shadow register 408, and comparator 400). In timing diagram 800, above time line 802, the counts or ticks of the SCLK signal are illustrated for a trigger window 804. The host has calculated the trigger window 804 to be large enough to handle all of the trigger events for the trigger element 406. Thus, if there are, as illustrated P events, and event seven (TE #7) occurs last, a count equal to $2^R$ is chosen as the trigger window where $2^R$ is the smallest power of two greater than the time for TE #7. Each of the trigger events TE #1-TE #P is loaded into the N-bit set-point register 412, and as the value at the counter 410 matches the data in the N-bit set-point register 412 at the comparator 400, the appropriate command or data is sent to the trigger element 406.

Similarly, FIG. 9 illustrates a timing diagram 900 for a single trigger element 602(1) of the slave 600 where the trigger element 602(1) may have multiple shadow registers 604(1,1-1,N) and multiple comparators 606(1,1-1,N). In timing diagram 900, above time line 902, the counts or ticks of the SCLK signal are illustrated for a trigger window 904. The host has calculated the trigger window 904 to be large enough to handle all of the trigger events for the trigger element 602(1). Thus, if there are, as illustrated P events, and event seven (TE #7) occurs last, a count equal to $2^R$ is chosen as the trigger window where $2^R$ is the smallest power of two greater than the time for TE #7. Each of the trigger events TE #1-TE #P is loaded into respective ones of the N-bit set-point registers 608(1,1-1,N), and as the value at the counter 610 matches the data in the N-bit set-point registers 608(1,1-1,N) at the comparators 606(1,1-1,N), the appropriate command or data is sent to the trigger element 602(1). Because there are plural shadow registers 604(1,1-1,N), multiple triggers can occur on the same count of the counter 610. For example, TE #12, TE #9, and TE #8 can all occur on the same count.

Similarly, FIG. 10 illustrates a timing diagram 1000 for the slave 600 where a given trigger element 602(1) may have multiple shadow registers 604(1,1-1,N) and multiple comparators 606(1,1-1,N). In timing diagram 1000, above time line 1002, the counts or ticks of the SCLK signal are illustrated for a trigger window 1004. The host has calculated the trigger window 1004 to be large enough to handle all of the trigger events for the trigger element 602(1). Thus, if there are, as illustrated P events, and event seven (TE #7) occurs last, a count equal to $2^R$ is chosen as the trigger window where $2^R$ is the smallest power of two greater than the time for TE #7. Each of the trigger events TE #1-TE #P is loaded into respective ones of the N-bit set-point registers 608(1,1-1,N), and as the value at the counter 610 matches the data in the N-bit set-point registers 608(1,1-1,N) at the comparators 606(1,1-1,N), the appropriate command or data is sent to the trigger element 602(1). In the timing diagram 1000, certain events may be repeated within the trigger window. Thus, for example, TE #1 and TE #9 are both repeated within the trigger window 1004.

Note that in an exemplary aspect, all events for a given trigger window are loaded to the slave in a single datagram. However, if the host learns of a need for a new trigger before expiration of the trigger window already sent to the slave, the host may know how many counts remain in the trigger window (because the count started on receipt of the original datagram) and may send a new datagram with a new trigger event for an N-bit set-point register that is adjusted to fall within a desired location of the existing trigger window.

Figure 11:
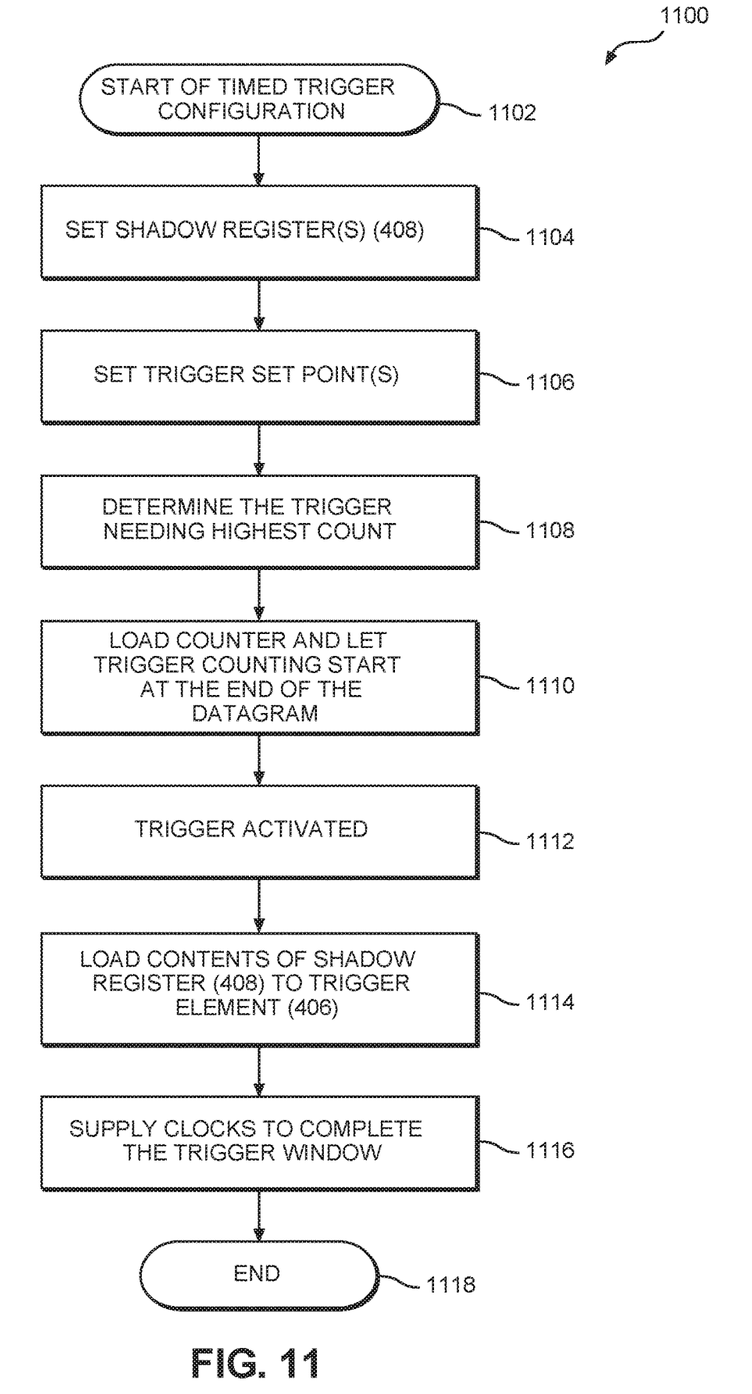
FIG. 11 is a flowchart illustrating an exemplary process for using the single counter with multiple triggers for triggered elements according to an exemplary aspect of the present disclosure.

FIG. 11 illustrates a process 1100 of a slave 200 in operation. In particular, the process 1100 begins with the start of a timed trigger configuration (block 1102). The host sets the shadow register 408 (block 1104) and sets the trigger set-points (block 1106). The host determines the trigger needing the highest count (block 1108) (e.g., TE #7). The host loads the counter 410 with the calculated trigger window ($2^R$) and lets the trigger counting start at the end of the datagram (block 1110). A trigger is activated when there is match between the set-point of the comparator 400 and the counter 410 (block 1112) and the contents of the shadow register 408 are loaded into the trigger element 406 (block 1114). The supply clocks to complete the trigger window (block 1116) and the process ends (block 1118).

The single-counter, multi-trigger systems and methods in communication systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An integrated circuit (IC), comprising:
   a bus interface configured to be coupled to a bus and configured to receive a datagram having multiple set-point comparison values and a trigger window, wherein the trigger window comprises a smallest power of two greater than a largest event time corresponding to a set-point comparison value, the datagram received from a host through the bus;
   a counter configured to use the trigger window to begin a count;
   a plurality of comparators, each comparator comprising a set-point register configured to store a plurality of set-point comparison values based on the datagram, each comparator coupled to the counter and configured to compare a value from the counter to at least one of the plurality of set-point comparison values in the set-point register and output a signal when there is a match;
   a plurality of shadow registers, each shadow register coupled to a respective one of the plurality of comparators and configured to receive the signal from the respective comparator; and
   a plurality of trigger elements, each trigger element coupled to a respective one of the plurality of shadow registers and configured to receive a register value stored in the respective shadow register when the respective shadow register receives the signal from the respective comparator.

2. The IC of claim 1, further comprising:
   a control circuit configured to:
      populate the plurality of set-point comparison values in at least one of the set-point registers; and
      populate the register value from the datagram to at least one of the plurality of shadow registers.

3. The IC of claim 2, wherein the bus interface comprises a radio frequency front end (RFFE) bus interface.

4. The IC of claim 1, wherein the IC comprises a tuner.

5. The IC of claim 1, wherein the IC comprises a switch.

6. The IC of claim 1, wherein the IC comprises a power amplifier and at least one trigger element comprises a low noise amplifier.

7. The IC of claim 2, wherein the control circuit is further configured to receive different datagrams, wherein individual ones of the different datagrams may be configured to program individual ones of the plurality of shadow registers and other ones of the different datagrams may program multiple ones of the plurality of shadow registers.

8. IC of claim 2, wherein the control circuit is further configured to receive different datagrams, wherein individual ones of the different datagrams may be configured to program individual ones of the set-point registers and other ones of the different datagrams may program multiple ones of the set-point registers.

9. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. The IC of claim 1, wherein each trigger element fires at a predetermined time on receipt of the register value from the respective shadow register independent of voltage or current conditions.

11. A method for controlling a trigger element in a slave integrated circuit (IC) coupled to a bus, the method comprising:
    loading a plurality of set-point values into a set-point register using a datagram sent from a host through the bus;
    loading a trigger window into a counter from the datagram, wherein the trigger window comprises a smallest power of two greater than a largest event time corresponding to a set-point value;
    when an output from the counter matches at least one set-point value of the plurality of set-point values in the set-point register in one of a plurality of comparators, outputting a signal to at least one of a plurality of shadow registers; and
    responsive to receiving the signal from the one of the plurality of comparators, loading a value from the at least one of the plurality of shadow registers to the trigger element.

12. The method of claim 11, further comprising receiving the datagram, wherein the datagram comprises a register value and the plurality of set-point values.

13. The method of claim 12, wherein receiving the datagram comprises receiving the datagram through a radio frequency front end (RFFE) bus.

14. The method of claim 11, further comprising comparing with the one of the plurality of comparators the output from the counter to the at least one set-point value of the plurality of set-point values in the set-point register.

15. The method of claim 11, wherein loading the value from the at least one of the plurality of shadow registers to the trigger element comprises loading the value to a switch.

16. The method of claim 11, wherein loading the value from the at least one of the plurality of shadow registers to the trigger element comprises loading the value to a low noise amplifier.

17. The method of claim 11, further comprising loading the at least one of the plurality of shadow registers with the value to be used by the trigger element.

18. The method of claim 11, wherein loading the value from the at least one of the plurality of shadow registers to the trigger element comprises loading the value to a tuner.

19. The method of claim 11, further comprising comparing the plurality of set-point values to the output of the counter with at least two comparators.

20. The method of claim 11, further comprising loading multiple values to different trigger elements during a single trigger window based on a single counter.

21. A radio frequency front end (RFFE) system, comprising:
    a host integrated circuit (IC) configured to calculate a trigger window as a smallest power of two based on a largest event corresponding to a set-point comparison value;
    an RFFE bus coupled to the host IC; and
    a slave IC, the slave IC coupled to the RFFE bus, and comprising:
        a bus interface configured to be coupled to the RFFE bus and configured to receive a datagram having multiple set-point comparison values and the trigger window from the host IC through the RFFE bus;
        a counter configured to use the trigger window to begin a count;
        a plurality of comparators, each comparator comprising a set-point register configured to store a plurality of set-point comparison values based on the datagram, each comparator coupled to the counter and configured to compare a value from the counter to at least one of the plurality of set-point comparison values in the set-point register and output a signal when there is a match;
        a plurality of shadow registers, each shadow register coupled to a respective one of the plurality of comparators and configured to receive the signal from the respective comparator; and
        a plurality of trigger elements, each trigger element coupled to a respective one of the plurality of shadow registers and configured to receive a register value stored in the respective shadow register when the respective shadow register receives the signal from the respective comparator.

* * * * *